No. 786,939. PATENTED APR. 11, 1905.
G. R. ALBAUGH.
TRANSMISSION GEAR.
APPLICATION FILED DEC. 15, 1902.
3 SHEETS—SHEET 1.
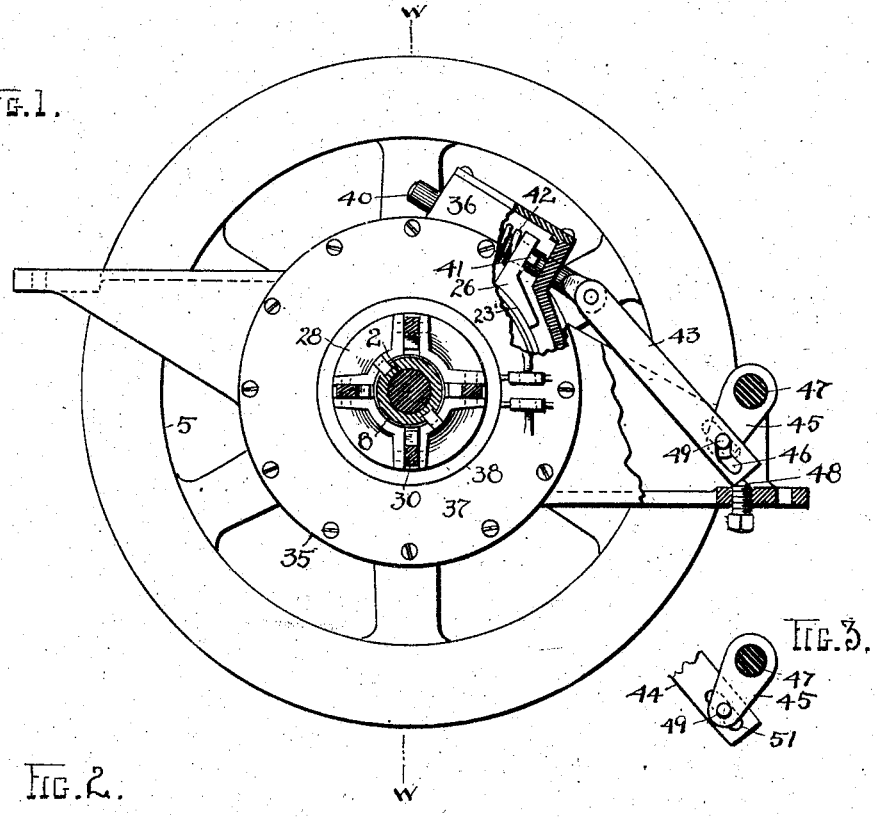
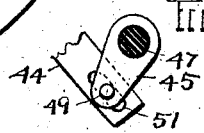
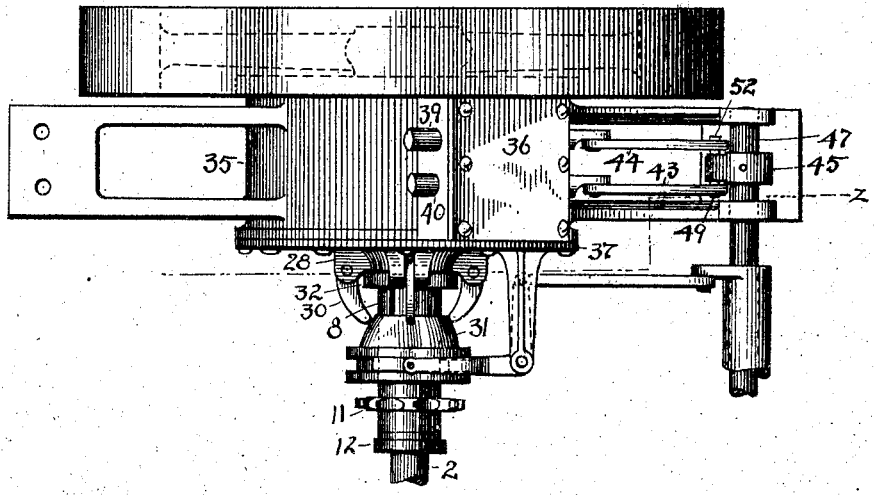
ATTEST.
T. B. Moser
A. N. Moser
INVENTOR.
Gilbert R. Albaugh
By H. T. Fischer ATTY

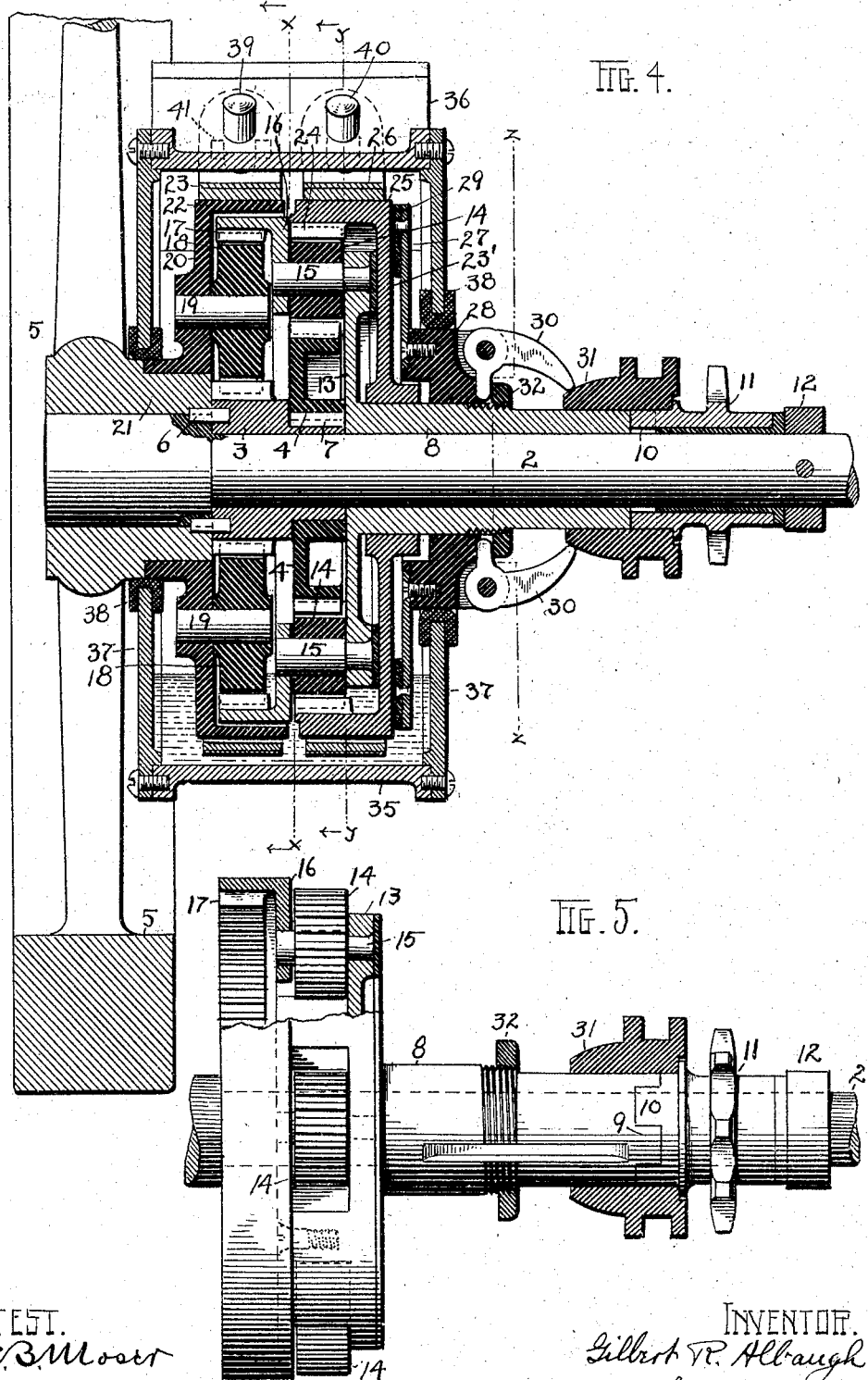

No. 786,939. PATENTED APR. 11, 1905.
G. R. ALBAUGH.
TRANSMISSION GEAR.
APPLICATION FILED DEC. 15, 1902.

3 SHEETS—SHEET 3.

ATTEST
R. B. Mosett
A. N. Moser.

INVENTOR.
Gilbert R. Albaugh
BY H. S. Fisher ATTY

No. 786,939. Patented April 11, 1905.

UNITED STATES PATENT OFFICE.

GILBERT R. ALBAUGH, OF CLEVELAND, OHIO, ASSIGNOR, BY MESNE ASSIGNMENTS, TO OLDS MOTOR WORKS, OF DETROIT, MICHIGAN, A CORPORATION OF MICHIGAN.

TRANSMISSION-GEAR.

SPECIFICATION forming part of Letters Patent No. 786,939, dated April 11, 1905.

Application filed December 15, 1902. Serial No. 135,258.

*To all whom it may concern:*

Be it known that I, GILBERT R. ALBAUGH, a citizen of the United States, residing at Cleveland, in the county of Cuyahoga and State of Ohio, have invented certain new and useful Improvements in Transmission-Gears; and I do declare that the following is a full, clear, and exact description of the invention, which will enable others skilled in the art to which it appertains to make and use the same.

My invention relates to improvements in transmission-gear, and the improvement is embodied in the novel construction and arrangement of parts, as hereinafter shown and described, and more particularly pointed out in the claims.

One of the objects of my improvement is to provide a compact and closely-assembled arrangement of transmission-gears with the high-speed clutch and drive-sprocket located at one and the same side and whereby several features of prime importance are obtained, which consist of economy of space on the power-shaft, direct driving connection with both shaft and fly-wheel, and a dust-proof casing and oil-reservoir for the protection and lubrication of all the gears.

Figure 6:
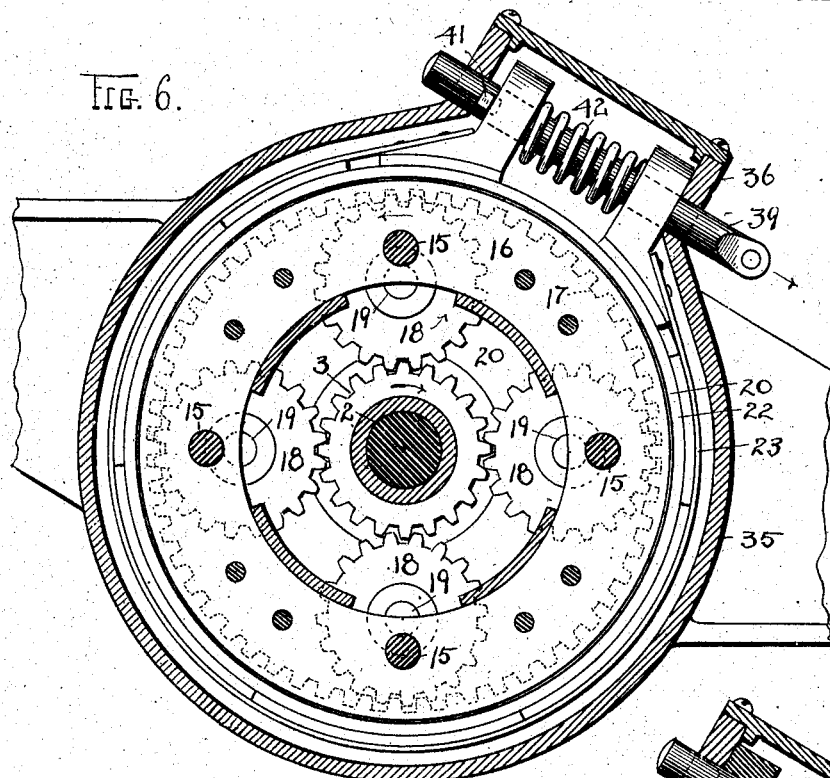
Figure 7:
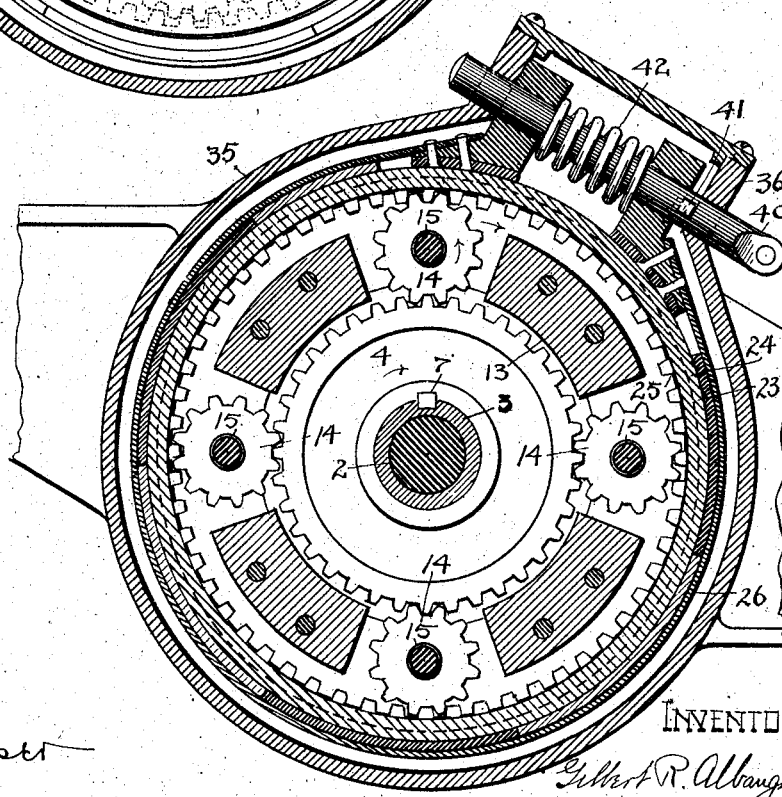

In the accompanying drawings, Figure 1 is a side elevation and cross-section on line *z z*, Fig. 2, of my improvement, and Fig. 2 is a plan view of the same. Fig. 3 is a detail view of one of the link and rock arm connections. Fig. 4 is a central longitudinal section on line *w w*, Fig. 1. Fig. 5 is a side elevation, partly sectioned, of the main driving-sleeve carrying the slow-speed pinions and the back-up or reversing internal gear. Fig. 6 is a cross-section on line *x x*, Fig. 4, showing a face view of the gears and pinions for reversing the rotation of the sprocket-wheel and with the band-brake for accomplishing this result. Fig. 7 is a cross-section on the line *y y*, Fig. 4, showing the band-brake and gears and pinions for obtaining forward driving at slow speed.

The transmission of power by means of my improved gear is divided into three distinct operations, which are separately under the control of the operator and consisting, first, in the means for locking all the parts to rotate with the power-shaft at the same speed, which is the maximum or high speed; second, in the means for locking the parts in part to establish a minimum or slow forward speed, and, third, in the means for establishing a reversal of power to the driven mechanism.

The power-transmitting mechanism is mounted and supported wholly upon a power or drive shaft 2, and the main drive-gears 3 and 4, respectively, are directly coupled and connected with said shaft and with the hub of fly-wheel 5 by means of pins or keys 6 and 7, respectively. Transmission of power is thus obtained from the source of supply through the fly-wheel direct, which lessens the twisting strain upon the power-shaft and permits the use of a power-shaft of smaller diameter than ordinarily.

A main driving-sleeve 8 is mounted upon shaft 2 immediately to the right of gear 4 and is free to rotate thereon, and the outer end of said sleeve is notched and provided with projections 9, which engage and interlock with similar notches and projections 10 upon the hub of a sprocket-wheel 11, which is also free to rotate upon power-shaft 2. Interlocking engagement is maintained between the projections 9 and 10 by means of collar 12, fastened to shaft 2 and bearing against the outer end of the hub of sprocket-wheel 11. The means thus employed to lock sprocket-wheel 11 and sleeve 8 together permit the use of a very small sprocket without sacrificing strength or requiring reduction of the material which bears the power-transmitting strain. Furthermore, the construction outlined makes it a simple matter to assemble said wheel and sleeve or to take them apart.

Sleeve 8 is provided with a flange 13 at its inner extremity, which carries a set of four slow-speed pinions 14, held in mesh with gear 4 and adapted to have a planetary movement around said gear. Pinions 14 are each located in a pocket on the inner face of flange 13 and are each supported by a short pin or shaft 15, fastened within flange 13 and projecting into a right-angled extension 16 of said flange. Extension 16 has internal gear-teeth 17, providing a gear-ring oppositely disposed to gear 3 on shaft 2, and between which a set of pinions 18 provide power-transmitting connection to revolve sleeve 8 in reverse direction from said shaft, but only under certain conditions as controlled by the operator. Thus pinions 18 are supported to revolve upon short studs 19, fastened upon a supporting disk or ring 20, which is sleeved upon a reduced portion 21 of the hub of the fly-wheel 5 and free to revolve thereon. Ring 20 has a projecting flange 22 all around, which incloses pinions 18 and extensions 17 of sleeve-flange 13, and said flange 22 is encircled by a frictional band-brake 23, by means of which the operator can frictionally engage said flange and hold ring 20 stationary. In so doing pinions 18 are caused to revolve upon their studs 19, and as said studs now have a fixed or stationary support power is transmitted to internal gear-teeth 17 to rotate sleeve 8 and sprocket-wheel 11 in the reverse direction to shaft 2.

Pinions 14 on pins 15 have a planetary travel around gear 4 during this reverse transmission of power.

When a slower revolution of sprocket-wheel 11 is desired than that of shaft 2 and in the same direction, pinions 14 become power-transmitting members to accomplish this end through the aid of an internal gear-ring 23', having teeth 24 on the inner side of a right-angle flange 25 and which teeth mesh with said pinions. To effect a slow speed in the forward direction requires means for holding gear-ring 23' stationary, and this comprises a band-brake 26, encircling flange 25 and which is under the control of the operator, as hereinafter more fully described.

When ring 23' is held stationary by band-brake 26, pinions 14 still have their planetary movement about gear 4; but as said pinions are provided with a less number of teeth than gear 4 the radial travel of their studs 15 is slower than the rotation of gear 4, and as said studs are rigid with flange 13 of sleeve 8 said sleeve, with its connected sprocket-wheel 11, is driven in the same direction as shaft 2, but at a greatly-reduced speed. During this slow-speed movement band-brake 22 is free to permit the reversing-pinions 18 and their ring-support 20 to revolve, said pinions then having a planetary travel about gear 3.

When transmission of power at full speed of shaft 2 is desired, sleeve 8 and ring 23' are locked together. In fact, all the rotatable parts heretofore described are locked to rotate with shaft 2 and fly-wheel 5. The means to accomplish this result comprises a spring-metal friction-disk 27, mounted upon a sliding spider 28, keyed upon sleeve 8. Disk 27 has a leather-lined face 29 at its outer edge which frictionally engages the side face of ring 23' when spider 28 is forced to the left. Disk 27 is fastened about its center to spider 28 and has sufficient spring resistance within itself to give the yielding contact which is so essential to the life and proper workings of a friction-brake of this kind and character. It will be further noticed that ring 23' is free to slide upon sleeve 8 and that when disk 27 is forced to the left for locking purposes said ring is locked by its engagement with a frictional surface of fiber or other suitable material mounted upon the face of flange 13 of sleeve 8.

The mechanism for sliding spider 28 to the left comprises a set of crank-arms 30, pivotally supported at their angular portion between ears upon said spider. The longer one of said crank-arms bears against a rounded or cone-shaped collar 31, which is sleeved and free to slide and rotate upon sleeve 8. Any suitable means for sliding said collar 31 may be used. The shorter one of the crank-arms bears against a nut 32, adjustably threaded upon sleeve 8, and when collar 31 is carried to the left the long arms are raised thereby, and the bearing-point of the shorter arms against nut 32 becomes the fulcrum of the movement, which forces spider 28 to the left through its pivoted connections with said crank-arms. Adjustment of nut 32 upon sleeve 8 limits or enlarges the distance of travel or slide of both ring 23' and spider 28 upon sleeve 8 and provides for the taking up of wear upon the frictional braking-faces.

The band-brakes 22 and 26 and all the transmission-gears and pinions are confined within a casing or receptacle 35, which is designed to protect said gear mechanism and provide an oil-chamber within which said gears are continually immersed in oil and also provides the support for said brakes and their tightening mechanism.

The body of casing or receptacle 35 is cylindrical with open sides and an angular opening or offset 36 at its top and with rigid arms or brackets extending front and rear, by means of which a fixed connection is had with fixed cross-bars or other suitable supports, as may be found necessary. Side plates 37, having central openings, are slipped over the hub of fly-wheel 5 and the hub of spider 28 and are screwed upon the casing-body to inclose the transmission-gears, and for further protection against admission of dirt and dust from without and against loss of oil from within I provide felt rings or washers 38 at the edges of the central openings, although if a fairly close but free fit is made said rings or washers may be omitted, because in practice I find that the oil is not thrown toward the center, but outwardly, by reason of centrifugal force.

Each band-brake 22 and 26, respectively, is provided at its ends with a plate having a projection or lug extending into offset 36 and through which a rod 39 and 40 for each brake 23 and 26, respectively, passes from side to side and out of the casing-body. A cross-pin 41 is fastened within each rod at one side of a lug on each band-brake, and a coiled spring 42 is sleeved over each rod between said lugs to normally keep the band-brake spread open and out of working engagement with the friction-faces of the transmission-gear rings. The lugs upon each band are carried toward each other by means of pin 41 when either rod 39 or 40 is operated, but as gear-rings 20 and 23' rotate in opposite directions. It is advisable for obvious reasons to place the cross-pin 41 of each rod behind the lug which moves inward to carry and wind the band upon its respective ring in the same direction of rotation. Therefore pin 41 is located behind the left lug of the band 23, encircling the reversing-ring 20, and rod 39 is drawn upon from the right to effect the frictional locking, whereas pin 41 of rod 40 for the slow-speed ring-band 26 is located behind the right lug, and locking is effected by pushing said rod to the left.

The means for sliding rods 39 and 40 in opposite directions to throw one or the other of the friction-bands into action is accomplished by links 43 and 44, which connect with arm 45, fastened upon a rock-shaft 47 directly under the control of the operator.

Arm 45 and link 43 operate to push upon rod 40, which closes the slow-speed ring-band 26, and permanent locking can be maintained for this band by reason of the angular slot 46 within link 43 and the pin 49 upon arm 45 and the adjustable stop 48, screwed into the supporting-bracket or arm-casing body 35. As shown in Fig. 1, pin 49 on arm 45 rests at the upper end of the angular slot 46 in link 43, and said link rests at its end against stop 48, thereby holding rod 40 rigidly to keep band-brake 26 closed.

When arm 45 is carried to the right by rock-shaft 47, pin 49 forces the lower end of link 43 upward and out of engagement with stop 48, and band 26 is opened by coiled spring 42.

Friction-band 23 is closed upon reversing-ring 20 when its rod 39 is carried to the right by link 44 and arm 45.

A straight slot 51 in the link and a pin 52 in the arm provide a take-up connection which allows the reverse sliding movement of the rods 39 and 40 to be obtained from fixed arms on the same rock-shaft. Each rod has an independent action, and only one rod and one band can be thrown and kept in action at one time.

What I claim is—

1. In transmission-gear, the combination of the speed-changing mechanism and fly-wheel with direct main drive-gears connecting the same, substantially as described.

2. In transmission-gear, the power-shaft and fly-wheel thereon, a main drive-gear and a key uniting said fly-wheel and gear together, and speed-changing gears and clutch mechanism for operating the same, substantially as described.

3. In transmission-gear, a power-shaft enlarged in diameter at one end, a fly-wheel mounted upon said enlargement, main drive-gears mounted upon the reduced portion of said shaft, and means to fasten said fly-wheel and drive-gears directly with said enlargement, substantially as described.

4. In power-transmitting gear, the power-shaft and fly-wheel thereon having a hub extension, main drive-gears directly keyed to said hub extension, and variable-speed gears meshing with said drive-gears, in combination with a clutch and a power-transmitting wheel sleeved at one and the same side of said gears, substantially as described.

5. In power-transmitting gear, the power-shaft and a fly-wheel thereon, main drive-gears mounted upon said shaft flush with said fly-wheel, keys coupling said gears direct to both shaft and fly-wheel, speed-changing gears and pinions in mesh with said drive-gears, a driven sprocket sleeved on said shaft, and frictional means for locking said gears for varying speeds, substantially as described.

6. In transmission-gear, the power-shaft, a fly-wheel having a hub keyed to said shaft, main drive-gears upon said shaft and pinned to said hub, a pinion-supporting ring sleeved upon said hub, pinions mounted upon said ring and meshing with the main drive-gear, a main driving-sleeve mounted free upon said shaft, a gear-ring rigidly connected with said sleeve and meshing with said pinions, a power-transmitting sprocket upon said shaft, and clutch mechanism for locking said parts together to transmit variable speeds to said sprocket, substantially as described.

7. In transmission-gear, a power-shaft and a hubbed fly-wheel thereon, a set of drive-gears pinned to the hub of said fly-wheel, a pinion-supporting ring rotatably sleeved on said hub, a set of pinions mounted on said ring and meshing with said drive-gear, a rotatable member sleeved on said shaft, a ring-gear on said member meshing with said pinions, a set of slow-speed pinions mounted on said member and meshing with one of said drive-gears, a second ring-gear removably and slidably mounted on said rotatable member, means to hold said rings separately against revolution, a clutch to lock said second ring-gear and rotatable member together, and a power-transmitting sprocket connected with said rotatable member, substantially as described.

8. In transmission-gears, a power-shaft and a gear-carrier mounted free thereon, a gear-ring rigidly affixed to said carrier at one side thereof, pockets between said ring and carrier and pinions revolubly mounted on said carrier within said pockets, and a gear-ring free on said carrier and a drive-gear on said power-shaft meshing with said pinions, in combination with a second pinion-carrier and pinions thereon and a drive-gear therefor, said latter pinions meshing with said gear-ring affixed to said gear-carrier, separate brakes for said free gear-ring and said pinion-carrier, and clutch mechanism to lock said gear-carrier and free gear-ring together, substantially as described.

9. In transmission-gear, a power-shaft having an enlarged portion and a fly-wheel provided with a hub extension rigidly mounted thereon, main drive-gears rigidly connected with said hubbed extension and said enlarged shaft portion, speed-changing gear mechanism driven by said main drive-gears, friction-brakes for said mechanism, a supporting-casing for said brakes comprising an oil-reservoir for said gear mechanism, and a high-speed clutch and driven sprocket-wheel sleeved on said power-shaft at one side of said mechanism, substantially as described.

10. In transmission-gear, the power-shaft and the speed-changing gear mechanism mounted thereon, said mechanism having a sleeved portion on said shaft provided with projections at its end, a sprocket-wheel sleeved on said shaft and provided with a hub having interlocking projections for rigid connection with said sleeved-portion projections, an operating-collar free to rotate upon said sleeved portions and said sprocket-wheel hub, and frictional clutch mechanism operatively controlled by said collar, substantially as described.

11. In transmission-gear, the power-shaft and speed-changing gear mechanism mounted thereon and driven thereby, a driven sprocket and a rotatable sleeve connected with said mechanism and free to rotate on said shaft, a friction-clutch for said mechanism having a supporting-spider splined to slide upon said sleeve, pivoted crank-arms on said spider, and an adjustable nut on said sleeve mounted opposite said crank-arms and engaged thereby, and means to actuate said arms to carry said clutch into action substantially as described.

12. In transmission-gears, a power-shaft, a set of reversing-gears and a set of slow-speed gears supported on said shaft, in combination with band-brake mechanism independently controlling the same, a support for said band-brake mechanism, a power-transmitting sprocket revolubly sleeved upon said shaft, a driving sleeved portion upon said shaft connecting said sprocket and the variable-speed power-transmitting mechanism, and a high-speed clutch constructed to lock gears for transmission of power at full speed and slidably supported upon said sleeved portion between said sprocket and said mechanism, substantially as described.

13. In transmission-gears, the combination of the power-shaft and a set of reversing-gears and a set of slow-speed gears with band-brakes and mechanism for controlling the same, a sleeved portion driven by said gears and mechanism and extending to one side thereof upon said shaft, a power-transmitting sprocket connected with and driven by said sleeve portion, and a friction-clutch and operating-collar slidably supported upon said sleeved portion, substantially as described.

14. A shaft, a gear-carrier having a hub for revolubly engaging said shaft, a body, a wall spaced apart therefrom, and braces connecting said wall and body at separate points, the parts being arranged with spaces between said wall, body, and braces, for receiving gears, and pintles mounted in said wall and body for supporting said gears.

15. In a planetary transmission-gearing the combination with two differential gear-trains each comprising a central gear, a planetary pinion, and a surrounding annular rack, of a head revoluble in axial alinement and adjacent to said central gears, and having an overhanging peripheral flange, said flange carrying at its outer edge the annular rack of one train, and being cut away for the passage therethrough of the planetary pinion of the other train, and bearings for supporting said pinion at opposite ends upon said head.

Witness my hand to the foregoing specification this 21st day of November, 1902.

GILBERT R. ALBAUGH.

Witnesses:
R. B. MOSER,
A. N. MOSER.